Patented Oct. 12, 1937

2,095,927

UNITED STATES PATENT OFFICE 2,095,927

PINE TAR AND RUBBER PRODUCTS

Herbert A. Endres, Silver Lake, Ohio, assignor to Wingfoot Corporation, Wilmington, Del., a corporation of Delaware No Drawing. Application January 16, 1935,
Serial No. 2,120

3 Claims. (Cl. 106—23)

This invention relates to the treatment of pine tar, a new pine tar product and to rubber products. More particularly, the invention relates to a heat-treated pine tar freed from malodorous phenolic constituents and rubber products made therefrom.

The principal constituents of pine tar as regards their value in the compounding of rubber may be grouped as follows:

1. Pine oil and other low boiling oils,
2. Phenolic compounds which include phenol, cresols, guaiacols and homologs thereof,
3. Rosin and fatty acids and esters.

The oils are of value as softeners. The acids and esters are effective as dispersing agents for carbon black and the like. The phenolic compounds may have some value but they have a strong, disagreeable odor, which imparts the characteristic smoky odor to rubber articles which are made from pine tar.

According to this invention the disagreeable odor is removed from the pine tar by converting the malodorous phenolic compounds into compounds which are substantially odorless or have a pleasing odor. This is advantageously done by heating the tar under pressure to form aryl esters from the phenolic compounds and organic acids, such as abietic acid, etc. which are present in the tar.

The pine tar may, for example, be heated for one to three hours in a closed vessel at a temperature of 100 degrees C. or higher. Pressures as high as 700 pounds per square inch have been generated in an autoclave by this process without having a bad effect on the product. The time and temperature of heating may be varied, depending upon the nature of the pine tar which is being treated.

One grade of pine tar sold commercially has an acid number of about 40 to 45 (as determined by electrometric titration) and on distillation under reduced pressure of for example, 8 to 11 mm. of mercury will yield approximately the following fractions:

| | Per cent |
|---|---|
| Below 140° C | 20 |
| 140–200° C | 16 |
| 200–240° C | 20 |
| 240–260° C | 18 |
| 260–280° C | 13 |
| Above 280° C | 13 |

If such a pine tar is heated in an autoclave for 45 minutes at 280° C. it will be found that the odor is immensely improved. A lower temperature and longer period of heating may be used. In this way the objectionable odor may be entirely removed, or any trace that remains will be masked by the pleasant odor of constituents of the resulting product. Furthermore the increase in the ester content of the resulting product makes it more desirable than the untreated pine tar as a dispersing agent. It may be used for dispersing carbon black and other pigments, etc. in a rubber mix. Rubber products made with the heat-treated pine tar do not have the objectionable odor ordinarily associated with heavy rubber goods such as tires, hose, etc. On the contrary, the increase in ester content gives them a pleasing odor.

A certain pine tar on distillation yielded approximately the following fractions:

| | Per cent |
|---|---|
| Below 200° C | 10.75 |
| 200° C.–260° C | 10.40 |
| 260° C.–300° C | 9.00 |
| 300° C.–330° C | 20.15 |
| 330° C.–340° C | 10.90 |
| 340° C.–350° C | 14.85 |
| Above 350° C | 12.00 |
| Yields: Distillates about | 80 |
| Tar about | 12 |
| Loss about | 8 |

This pine tar after heating in an autoclave at 280° C. and 10 pounds pressure per square inch for 45 minutes on distillation gave the following fractions:

| | Per cent |
|---|---|
| Below 200° C | 4.2 |
| 200° C.–260° C | 16.8 |
| 260° C.–300° C | 3.4 |
| 300° C.–330° C | 34.2 |
| 330° C.–334° C | 23.6 |
| Yields: Distillates about | 82 |
| Tar about | 13 |
| Loss about | 5 |

This pine tar before heat treatment had a viscosity of 11 R. P. M. measured in a Stormer viscosimeter with a 50 gr. weight at 75° F. and after heat treatment had a viscosity of 8 R. P. M.

Pine tar which had been heated in an autoclave at 280 degrees C. for 45 minutes was used for dispersing carbon black in rubber according to the following formula:

| | |
|---|---|
| Rubber | 55 |
| Carbon black | 40 |
| Heat treated pine tar | 5 |

This master batch was then further compounded to form the following:

| | |
|---|---|
| Rubber | 100 |
| Zinc oxide | 5.60 |
| Carbon black | 43.30 |
| Sulfur | 2.80 |
| Heat treated pine tar | 5.80 |
| Stearic acid | 4.10 |
| Mercaptobenzothiazole | 1.35 |
| Phenyl beta naphthylamine | 1.00 |

The rubber so compounded was used as the tread in a pneumatic tire. As compared with rubber similarly compounded, using ordinary pine tar the heat-treated product gives an increase in modulus and tensile strength and the rubber is more resistant to abrasion than that in which ordinary pine tar is employed as the dispersing agent. A tread so compounded is therefore superior to the tread ordinarily employed.

The following table shows a comparison of samples of rubber cured at 260 degrees C. for the number of minutes indicated. The heat treated pine tar was prepared by heating in an autoclave for two hours at 300 degrees C. The formula used for compounding the rubber in making these tests was the same as that given above.

| Ordinary pine tar | | | | |
|---|---|---|---|---|
| Cure | Tensile | Modulus | | Abrasion cc. loss/H.P.hr. (Goodyear abrasion machine) |
| | | 300% | 500% | |
| Minutes | | | | |
| 35 | 210 | 42 | 111 | |
| 50 | 285 | 67 | 161 | |
| 70 | 310 | 84 | 194 | 253 |
| 100 | 294 | 99 | 224 | 269 |
| 140 | 295 | 120 | 253 | |
| Heat treated pine tar | | | | |
| 35 | 270 | 53 | 135 | |
| 50 | 294 | 73 | 178 | |
| 70 | 316 | 90 | 206 | 180 |
| 100 | 313 | 106 | 236 | 186 |
| 140 | 299 | 122 | 261 | |

This material therefore offers a very cheap and effective agent for dispersing carbon black in rubber, which has a pleasant odor and imparts superior properties to the vulcanized compounded rubber.

I claim:

1. The method of treating pine tar which comprises heating the pine tar under such a pressure at a temperature of about 280–300° C. to cause esterification of malodorous phenolic compounds and acids present in the tar and for a time to produce a product which contains no such phenolic compounds and is substantially free from malodorous constituents.

2. A pine tar heated at a temperature of about 280–300° C. which contains phenolics of the pine tar in chemical combination and is substantially free from malodorous constituents.

3. Rubber containing pine tar having a high content of aryl esters produced by heating at a temperature of about 280–300° C., characterized by the substantial absence of malodorous phenolic constituents.

HERBERT A. ENDRES.